Figure 1:
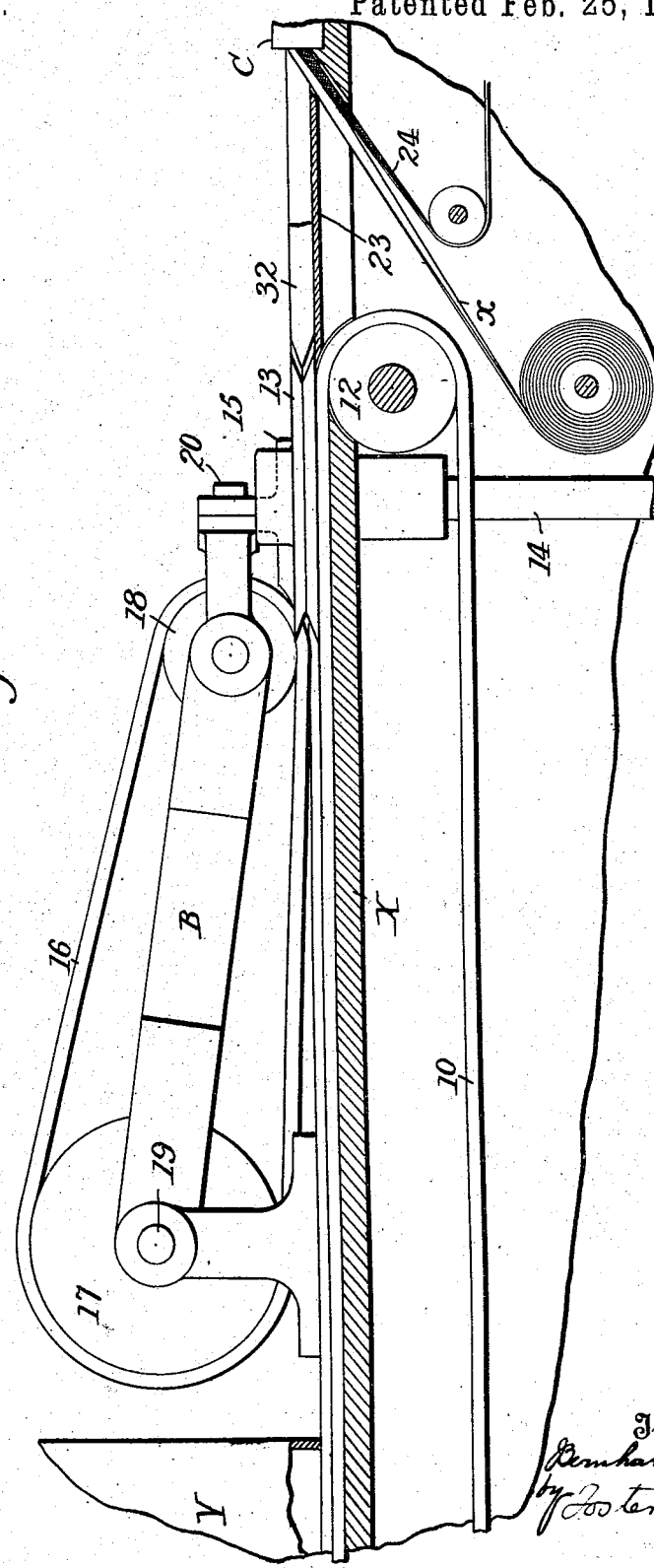

(No Model.) 5 Sheets—Sheet 1.
B. BARON.
METHOD OF AND APPARATUS FOR MANUFACTURING CIGARETTES.
No. 555,419. Patented Feb. 25, 1896.

Witnesses
Jno. G. Hinkel

Inventor
Bernhard Baron
by Foster & Freeman
Attorneys

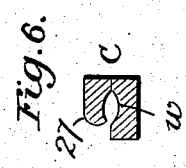
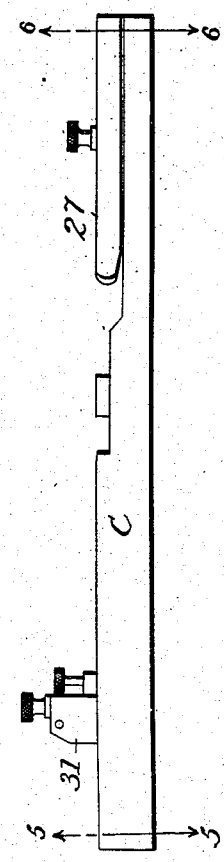
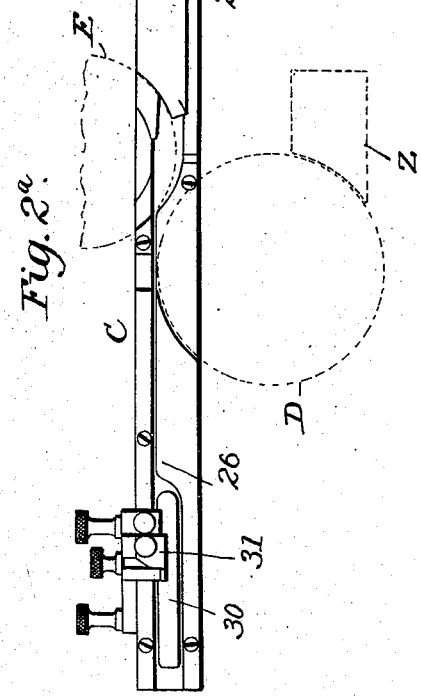
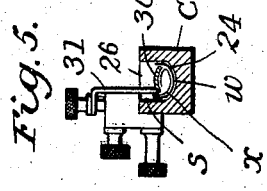

(No Model.)　　　　　　　B. BARON.　　　5 Sheets—Sheet 3.
METHOD OF AND APPARATUS FOR MANUFACTURING CIGARETTES.
No. 555,419.　　　　　　　　　　Patented Feb. 25, 1896.

Witnesses
Jno G Hinkel
J. A. Faugiere

Inventor
Bernhard Baron
by Foster Freeman
Attorneys (No Model.) 5 Sheets—Sheet 4.
B. BARON.
METHOD OF AND APPARATUS FOR MANUFACTURING CIGARETTES.
No. 555,419. Patented Feb. 25, 1896.

(No Model.) 5 Sheets—Sheet 5.

B. BARON.
METHOD OF AND APPARATUS FOR MANUFACTURING CIGARETTES.

No. 555,419. Patented Feb. 25, 1896.

Witnesses
Inventor
Bernhard Baron
Attorneys

UNITED STATES PATENT OFFICE.

BERNHARD BARON, OF NEW YORK, N. Y.

METHOD OF AND APPARATUS FOR MANUFACTURING CIGARETTES.

SPECIFICATION forming part of Letters Patent No. 555,419, dated February 25, 1896.

Application filed December 11, 1895. Serial No. 571,766. (No model.)

*To all whom it may concern:*

Be it known that I, BERNHARD BARON, a citizen of the United States, residing in the city, county, and State of New York, have invented certain new and useful Improvements in Methods of and Apparatus for Manufacturing Cigarettes, of which the following is a specification.

The ordinary cylindrical form of cigarettes is objectionable, because the lips cannot close tightly against the sides of the cylinder, and it is therefore a common thing with smokers to compress or flatten the mouth end of the cigarette after the same has become moistened. For this reason some of the higher grades of cigarettes are made by hand of a substantially elliptical shape in cross-section, and some of the objections to the cylindrical form are thereby obviated. Repeated attempts have been made to make cigarettes elliptical instead of cylindrical by machinery, generally by first making a cylindrical cigarette and then flattening the cigarette or cigarette rod. These efforts have not been successful, because after the cigarette rod has been made to a given shape, as a cylinder, any subsequent pressure to alter this shape simply breaks up the continuity of the filler of tobacco, and renders the cigarette soft and spongy and easily bent and practically with no definite shape in cross-section.

I have discovered that it is possible to make a continuous cigarette-rod of substantially elliptical shape in cross-section, capable of being cut up into cigarettes of a better quality and more durable than those made by hand, by first molding the tobacco directly into the form of a continuous tobacco rod, substantially elliptical in cross-section, and then forming a continuous elliptical paper tube inclosing said rod and maintaining the tobacco under compression in its elliptical form during and after the folding and pasting of the wrapper, as fully set forth hereinafter and as illustrated in the accompanying drawings, in which—

Figure 2:
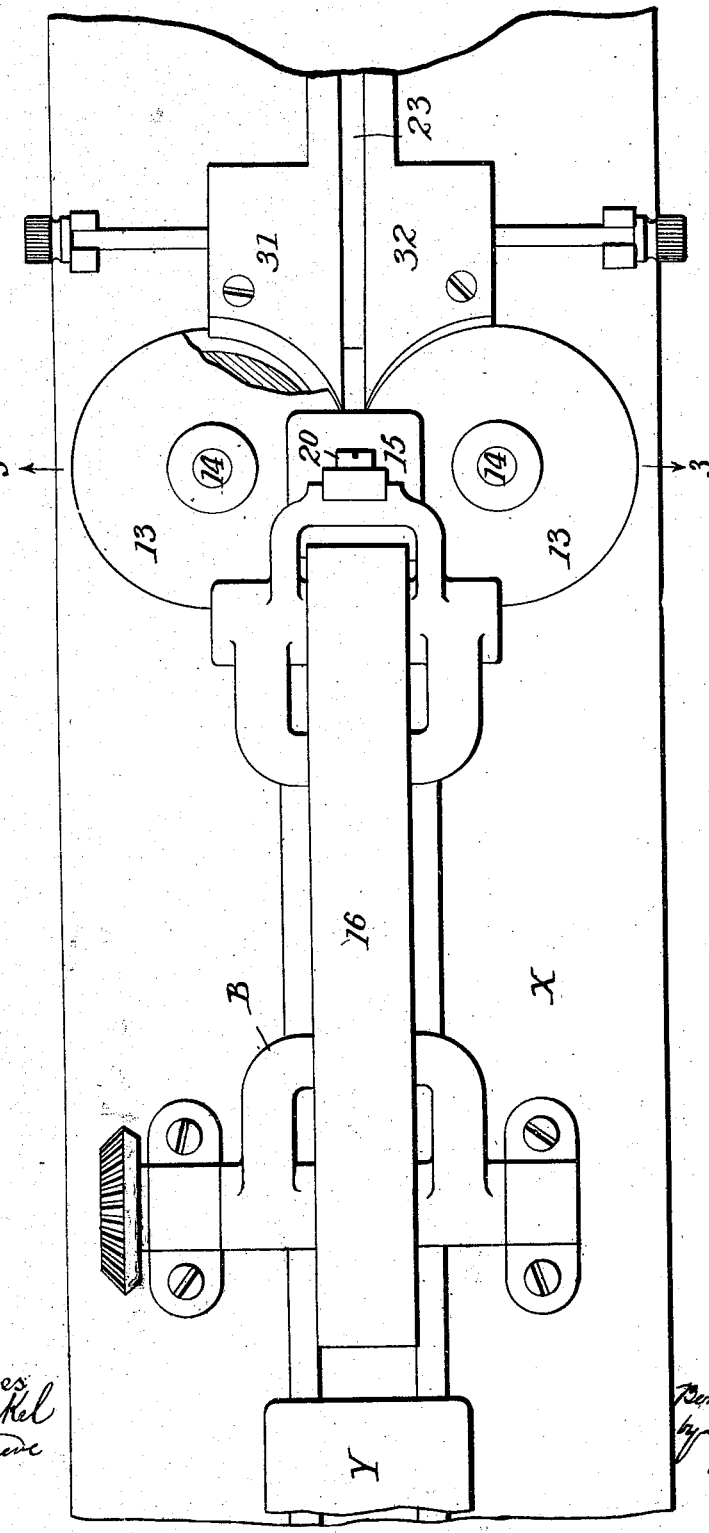
Figure 3:
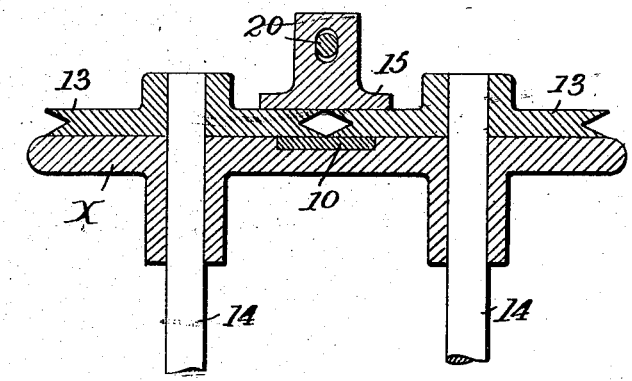
Figure 4:
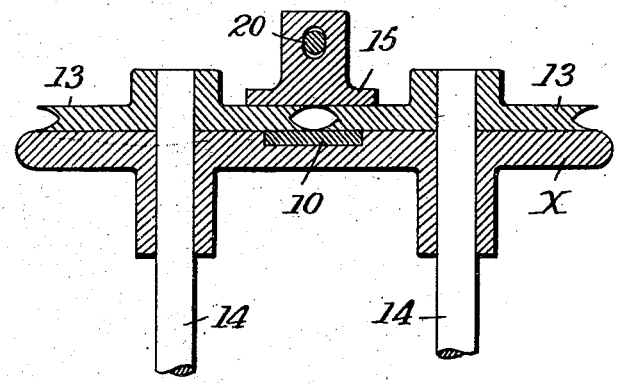
Figure 7:
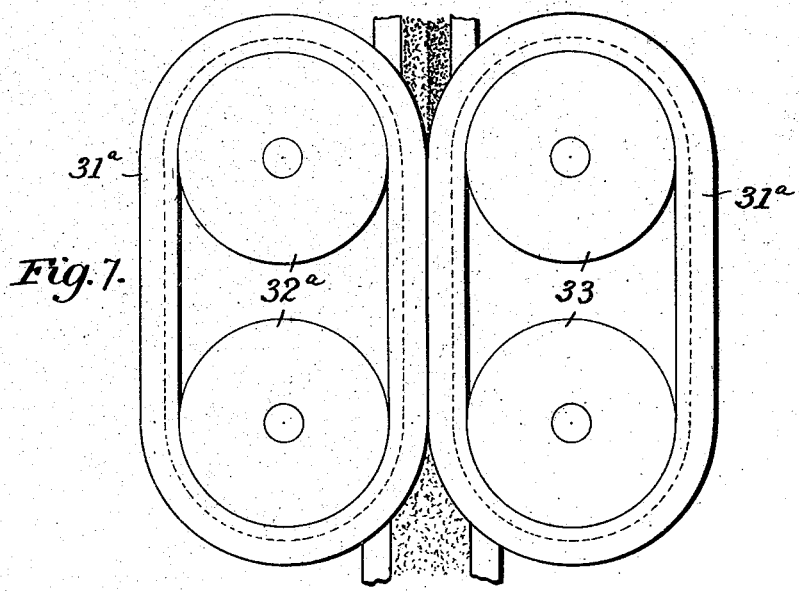
Figure 8:
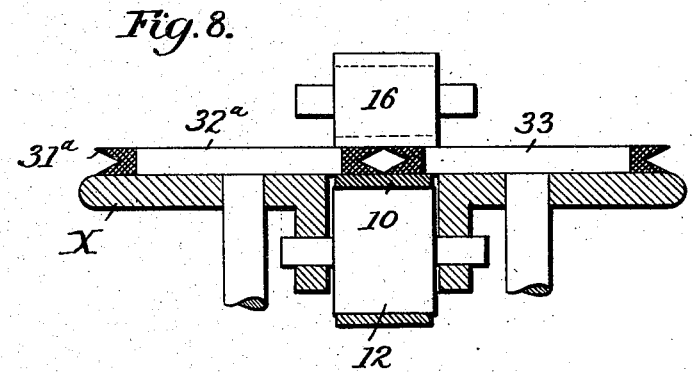
Figure 9:
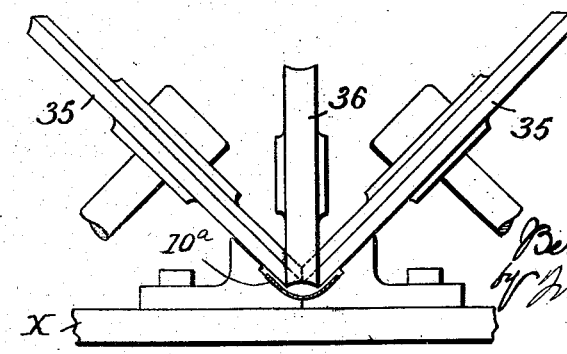

Figures 1 and 1ª together represent in side elevation sufficient of a cigarette-making machine to illustrate my improvement. Figs. 2 and 2ª are plan views of the parts shown in Figs. 1 and 1ª. Fig. 3 is a cross-section on the line 3 3, Fig. 2. Fig. 4 is a similar cross-section showing different forms of grooves on the molding-wheels. Fig. 5 is a section on the line 5 5, Fig. 1ª. Fig. 6 is a section on the line 6 6, Fig. 1ª. Fig. 7 is a plan view illustrating a different form of molding device. Fig. 8 is an end view of the part shown in Fig. 7. Fig. 9 is an elevation illustrating another form of molding device.

Referring to the construction shown in Figs. 1 to 6, the frame of the machine is constructed in any suitable manner to support a bed X, above which travels a continuous band 10, passing around pulleys 12 and beneath a feeding device Y, of any suitable character, from which the tobacco in proper condition is fed in a continuous row onto the band 10.

Above the band 10 is the molding device, which, as shown in Figs. 1 to 3, consists of a pair of wheels or disks 13 13 with their peripheries substantially in contact and overlapping the band and mounted upon shafts 14 14, which are positively driven in any suitable manner, not necessary to be here shown, and above the disks and crossing their meeting-point and closely in contact therewith extends a plate 15.

Above the belt 10 another belt 16 is supported by two wheels 17 18 in a frame B, swinging about the shaft 19 of the wheel 17, which shaft may be driven in any suitable manner to impart the same speed to the belt 16 as that of the belt 10.

If desired, as shown, the plate 15 may be bolted by a bolt 20 to the end of the frame B, so as to permit the frame to be set so that the tobacco upon the belt 10 will be compressed by the belt 16 to such an extent that all of the fibers thereof will pass between the wheels 13 13 and below the end of the plate 15, thereby preventing the fibers from catching between the edges of the wheels and the plate. These features need not be more specifically described, as they are not herein claimed, but are fully set forth in my application for Letters Patent, Serial No. 567,508, filed October 31, 1895.

Each wheel is provided in its periphery with a groove of such a shape that the two grooves together at the point where they meet will constitute a molding-chamber greater in width than in height that will reduce the tobacco passing between the wheels to a continuous tobacco rod substantially elliptical in cross-section. The grooves may have flat faces, as shown in Fig. 3, or curved faces, as shown in Fig. 4, the latter form being preferable; but in either case the tobacco is so compressed and thrown laterally and molded that when it expands slightly after passing between the wheels it will be substantially or approximately of an elliptical cross-sectional chamber.

After the tobacco rod is compressed to its greatest extent between the proximate portions of the wheels it passes between the edges of two scraper-plates 31 32, which fit closely to the wheels and prevent any portions of the tobacco from being carried around and away from the rod, which then passes over a bridge 23 and onto the wrapper-strip, which is carried with a narrower endless belt 24 into the trough C of the wrapping device.

In order to make the paper tube or wrapper of an elliptical or approximately elliptical form corresponding to that of the rod or filler, I make the trough C with a curved bottom face $w$, the curve being greater or flatter than the curve of a half-circle of a diameter equally the width of the trough, and from one side of the trough extends an overhanging flange or portion 26 nearly to the opposite side of the trough, leaving a space $s$ for the standing edge of the wrapper, the under face of the flange 26 being curved, but reversely, to the same degree as the bottom $w$ of the trough. The opposite edge of the wrapper to the standing edge is turned in by the flange 26, which standing edge is then carried against the edge of a paster-wheel D, which is supplied with paste from a suitable reservoir Z, and which applies a line of paste to the said edge, which latter is then turned down by a folder-wheel E onto the opposite inturned edge of the strip, which is thus formed into a tube. The said tube, with its filler, is then carried along the trough beneath an overhanging flange 27, which slightly compresses the cigarette rod and holds the parts in place until the paste has thoroughly set and dried, when the rod will pass out of the trough having a permanent elliptical shape in cross-section. Suitable cutting devices, not necessary to be here shown, then sever the rod into cigarettes of proper length.

It is preferable to make use of a short curved plate 30, suspended by a bracket 31 in such a position as to press upon the tobacco rod as it enters the trough and before one side of the wrapper is turned down, the said side of the wrapper passing into the trough, then being turned down upon the top of the plate 30 and under the flange 26.

Instead of making use of a molding device in which the moving sections or parts consist of grooved wheels, the said sections or parts may consist of traveling bands $31^a$ $31^a$, each supported and driven by wheels $32^a$ 33, and having grooves of the same shape as those shown in the wheels or disks before described.

In this case the belt 10 will pass beneath the bands and the belt 16 above the bands, as shown in Fig. 8.

Instead of using two opposite grooved wheels, as described, the roll of tobacco may be carried upon a belt $10^a$, Fig. 9, running in a channel having a groove of such a curve as to impart the proper form to the under face of the tobacco rod, while inclined wheels 35 35 meet at their peripheries and are so shaped as to impart the proper form to the upper face of the rod, a wheel 36 in advance of the wheels 35 pressing upon the tobacco so as to bring all portions of the same beneath the faces of wheels 35.

I have found that by molding the tobacco into a rod of the elliptical cross-sectional shape before applying the wrapper, and then folding and forming the wrapper around the rod and of the same shape, and holding both under pressure until the paste is set, I am enabled to produce elliptical cigarettes by machinery at a fraction of the cost of those made by hand, and much superior to the hand-made cigarettes. In all of the hand-made cigarettes the tobacco is so loosely confined that the cigarette can readily lose its shape, and, furthermore, the tobacco, with but slight handling, will fall from the ends or can be completely discharged from the wrapper, while the cigarettes made as above described will retain their shape under any necessary handling, the tobacco is held in place under such handling, even to the extreme ends of the wrappers, and cannot possibly be forced out of the wrapper.

I am aware that it has been proposed to mold cigarette rods to different forms by first rolling a rod to one shape and then rolling it to another, reducing it by two or more changes until the desired form is attained, although I do not know of any proposed definite means of making an elliptical cigarette in this way. I have found, however, by practical experience that if tobacco from the mass is first rolled or molded to any shape, any subsequent treatment altering the shape will result in breaking down the rod and destroying its integrity, and that a solid substantial filler cannot be thus effectively produced, and any cigarettes made therefrom are weak, spongy, and liable to lose their shape by handling. I finally discovered that by operating so as to reduce the rod to its shape from the mass by a direct reduction an elliptical rod could be molded so as to be solid and uniform, and retain its firmness at the edges, and that the cigarettes made therefrom maintained their shape far better than those made by hand or otherwise, as before.

While I have heretofore referred to the fact that elliptical cigarettes have been made by hand, I do not wish it to be understood that such hand-made cigarettes have the characteristics of those made by the process and means above described, because in all hand-made cigarettes the tobacco is first rolled to a cylindrical shape and then crushed so as to break down the cylinder to flatten the same, which results in many disadvantages not necessary to herein fully set forth, as they are fully specified in a separate application for Letters Patent, Serial No. 576,326, filed January 21, 1896.

Without limiting myself to the special tobacco-molding and wrapper-forming devices herein described, I claim as my invention—

1. The within-described improvement in the art of making elliptical cigarettes, the same consisting in reducing a mass of tobacco directly to the form of a continuous rod elliptical in cross-section, in molding a wrapper-strip into a continuous elliptical tube, and inclosing the rod therein, the tobacco being maintained under compression in its elliptical shape during and after the wrapping, molding, and pasting of the paper strip, substantially as described.

2. The combination with means for feeding a continuous row of tobacco, of devices for operating upon the tobacco to convert it into a continuous rod elliptical in cross-section, means for applying a strip of wrapper-paper to the rod, and for forming the paper into a tube elliptical in cross-section, and means for maintaining the rod under unyielding compression in its elliptical shape during and after the folding and pasting of the strip, substantially as described.

3. The combination of two molding-wheels, each grooved to form a substantially elliptical molding-space at the meeting-point of their peripheries, means for feeding a continuous row of tobacco to said wheels, a wrapping-chamber beyond the wheels having a bottom with a flat curve and an overhanging flange with its under face similarly curved, and a continuous belt traveling through said chamber, substantially as set forth.

In testimony whereof I have signed my name to this specification in the presence of two subscribing witnesses.

BERNHARD BARON.

Witnesses:
CHARLES E. FOSTER,
W. CLARENCE DUVALL.